(12) United States Patent
Meisner et al.

(10) Patent No.: US 11,079,733 B2
(45) Date of Patent: Aug. 3, 2021

(54) ADAPTIVE ANTI-WINDUP PROTECTION OF CASCADED INNER AND OUTER CONTROL LOOPS

(71) Applicant: United Technologies Corporation, Farmington, CT (US)

(72) Inventors: Richard P. Meisner, Glastonbury, CT (US); Kyle C. Musselman, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 34 days.

(21) Appl. No.: 16/395,971

(22) Filed: Apr. 26, 2019

(65) Prior Publication Data

US 2020/0341442 A1    Oct. 29, 2020

(51) Int. Cl.
   *G05B 19/048*    (2006.01)
(52) U.S. Cl.
   CPC .. *G05B 19/048* (2013.01); *G05B 2219/25375* (2013.01)
(58) Field of Classification Search
   CPC ................ G05B 19/048; G05B 2219/25375
   See application file for complete search history.

(56) References Cited

U.S. PATENT DOCUMENTS

| | | | |
|---|---|---|---|
| 4,028,601 A * | 6/1977 | Peterson | ............ H02P 7/34 318/271 |
| 5,570,282 A | 10/1996 | Hansen et al. | |
| 5,980,080 A | 11/1999 | Loparo et al. | |
| 9,494,085 B2 | 11/2016 | Cai | |

(Continued)

FOREIGN PATENT DOCUMENTS

| | | |
|---|---|---|
| EP | 3045696 A1 | 7/2016 |
| EP | 3093718 A2 | 11/2016 |
| WO | 2018112174 A1 | 6/2018 |

OTHER PUBLICATIONS

Douglas, Understanding PID Control, Part 2: Expanding Beyond a Simple Integral, 2018, https://www.mathworks.com/videos/understanding-pid-control-part-2-expanding-beyond-a-simple-integral-1528310418260.html?s_tid=vid_pers_recs (Year: 2018).*

(Continued)

*Primary Examiner* — Mark A Connolly
(74) *Attorney, Agent, or Firm* — Cantor Colburn LLP

(57) ABSTRACT

A method of adaptive anti-windup protection for a control system with cascaded inner control loop and an outer control loops. The method includes receiving an outer loop feedback signal indicative of the response of a plant controlled by the outer control loop and calculating an inner control loop request such that, it would cause saturation of the control device controlled by the inner control loop. The method also includes converting the calculated inner loop request to outer loop anti-windup request limits using kinematic relationships and transmitting the outer loop anti-windup request limits to a controller of the outer control loop. The method may also include applying the outer loop anti-windup request limits to a controller of the outer control loop to limit the inner loop request generated thereby, and executing an outer control loop control law and an inner control loop control law subject to the anti-windup request limits.

18 Claims, 3 Drawing Sheets

(56) References Cited

U.S. PATENT DOCUMENTS

| | | |
|---|---|---|
| 9,964,929 B2 | 5/2018 | Trnka et al. |
| 10,203,667 B2 | 2/2019 | Escarcega et al. |
| 2006/0116783 A1 | 6/2006 | Aghili et al. |
| 2015/0113996 A1 | 4/2015 | Cai et al. |
| 2016/0169136 A1 | 6/2016 | Devarakonda et al. |

OTHER PUBLICATIONS

Douglas, Understanding PID Control, Part7: Important PID Concepts, 2018, https://www.mathworks.com/videos/understanding-pid-control-part-7-important-pid-concepts-1533639185431.html (Year: 2018).*

European Search Report for European Application No. 20164341.8; Application Filing Date Mar. 19, 2020; dated Sep. 4, 2020 (8 pages).

* cited by examiner

ADAPTIVE ANTI-WINDUP PROTECTION OF CASCADED INNER AND OUTER CONTROL LOOPS

BACKGROUND

Exemplary embodiments of the present disclosure pertain to the art of constraining and controlling windup in integrator based controllers. More specifically adaptively controlling windup in cascaded inner and outer control loops.

An anti-windup system is an essential part of a process controller with integrating control action (such as PI and PID controllers) that significantly improves control quality (e.g. reference tracking quality) and eliminates error accumulation. The process controller output either directly manipulates an actuator or provides a reference for a subsequent cascaded controller. In both cases those systems have a certain input range that must be respected. It is well known that a simple clamping of the controller output to this range without anti-windup system can lead to delayed controller reaction and poor control quality. This is caused by an unconstrained value of the integrator that can push the controller output far from the range. The functionality of the anti-windup system is to adjust the integrator value such that the controller output is within the range and such that it promptly reacts to disturbances and reference changes.

A standard anti-windup system has two main requirements. It must be able to adjust the controller integrator value and it must know an input range of a system connected to the controller output. Due to the first requirement and due to practical considerations, an anti-windup system is usually an integral part of a controller. However, there are cases, where it is not possible to simultaneously meet both requirements. Moreover, while these anti-windup techniques are effective they can be overly conservative, as the rate and range limits employed on the outer loop request are typically based on assumed (worst case) actuator capabilities.

Therefore it would be advantageous to have a control system with anti-windup capabilities that take full advantage of available actuation system functionality and capability as well as provide integrator anti-windup protections under failure conditions such as a sticking or sluggish actuator, which may result in poor control (large overshoot) upon recovery.

BRIEF DESCRIPTION

Disclosed herein in one or more embodiments is a method of adaptive anti-windup protection for a control system with cascaded inner control loop and an outer control loops, the method including receiving an inner control loop feedback signal indicative of a response of a control device controlled by an inner control loop and calculating an inner control loop request such that, it would cause saturation of the control device controlled by the inner control loop. The method also includes converting the inner control loop request to outer loop anti-windup request limits using kinematic relationships between the control device and the plant and transmitting the outer loop anti-windup request limits to a controller of the outer control loop.

In addition to one or more of the features described above, or as an alternative to any of the foregoing embodiments, the method may also include applying the outer loop anti-windup request limits to a controller of the outer control loop to limit the inner control loop request generated thereby, receiving an outer loop feedback signal indicative of a response of a plant controlled by the outer control loop, executing an outer control loop control law based on the outer loop anti-windup request limits; and executing an inner control loop control law subject to the outer loop anti-windup request limits.

In addition to one or more of the features described above, or as an alternative to any of the foregoing embodiments, the method may also include that the control device controlled by the inner control loop is an actuator.

In addition to one or more of the features described above, or as an alternative to any of the foregoing embodiments, the method may also include that the inner control loop feedback signal is at least one of a position of the actuator, a rate of the actuator, and a current drawn by the actuator under selected conditions.

In addition to one or more of the features described above, or as an alternative to any of the foregoing embodiments, the method may also include that the calculating the inner control loop request is based on at least one of the inner control loop feedback signal, a command of the control device controlled by the inner control loop that would result in saturation of the control device, and an inverse of a transfer function of a controller of the inner control loop.

In addition to one or more of the features described above, or as an alternative to any of the foregoing embodiments, the method may also include modifying the outer loop anti-windup request limits if the control device controlled by the inner control loop operates at saturation.

In addition to one or more of the features described above, or as an alternative to any of the foregoing embodiments, the method may also include that the plant controlled by the outer control loop is a gas turbine engine.

In addition to one or more of the features described above, or as an alternative to any of the foregoing embodiments, the method may also include that the outer loop feedback signal is at least one of a pressure, a temperature, a fuel flow associated with the gas turbine engine under selected conditions.

In addition to one or more of the features described above, or as an alternative to any of the foregoing embodiments, the method may also include that the outer loop anti-windup request limits permit the control device controlled by the inner control loop faster response in operation than predetermined limits.

In addition to one or more of the features described above, or as an alternative to any of the foregoing embodiments, the method may also include that the outer loop anti-windup request limits permits more robust anti-windup protection under degraded operating conditions of the control device controlled by the inner control loop, wherein the degraded operation include sticking or sluggish operation compared to specified operation.

Also disclosed herein in another embodiment is a control system with cascaded inner control loop and an outer control loops having adaptive anti-windup protection. The control system includes a control system including a controller having a cascaded inner control loop and the outer control loop, a control device responsive to the inner control loop, and a plant responsive to the control device and the outer control loop. The controller is configured implement a method to receive an inner control loop feedback signal indicative of a response of a device controlled by the inner control loop, calculate an inner control loop request such that, it would cause saturation of the device controlled by the inner control loop, convert the inner control loop request to outer loop anti-windup request limits using kinematic relationships between the control device and the plant, and transmit the outer loop anti-windup request limits to a controller of the outer control loop.

In addition to one or more of the features described above, or as an alternative to any of the foregoing embodiments, the system may also include that the controller is further configured to apply the outer loop anti-windup request limits to a controller of the outer control loop to limit the inner control loop request generated thereby, receive an outer loop feedback signal indicative of a response of the plant controlled by the outer control loop, execute an outer control loop control law based on the outer loop anti-windup request limits, and execute an inner control loop control law subject to the outer loop anti-windup request limits.

In addition to one or more of the features described above, or as an alternative to any of the foregoing embodiments, the system may also include that the control device controlled by the inner control loop is an actuator.

In addition to one or more of the features described above, or as an alternative to any of the foregoing embodiments, the system may also include that the inner control loop feedback signal is at least one of a position of the actuator, a rate of the actuator, and a current drawn by the actuator under selected conditions.

In addition to one or more of the features described above, or as an alternative to any of the foregoing embodiments, the system may also include that calculating the inner control loop request is based on at least one of the inner control loop feedback signal, a command of the device controlled by the inner control loop that would result in saturation of the device, and an inverse of a transfer function of a controller of the inner control loop.

In addition to one or more of the features described above, or as an alternative to any of the foregoing embodiments, the system may also include the controller modifying the outer loop anti-windup request limits if the device controlled by the inner control loop operates at saturation.

In addition to one or more of the features described above, or as an alternative to any of the foregoing embodiments, the system may also include that the plant controlled by the control device and the outer control loop is a gas turbine engine.

In addition to one or more of the features described above, or as an alternative to any of the foregoing embodiments, the system may also include that the outer loop feedback signal is at least one of a pressure, a temperature, a fuel flow associated with the gas turbine engine under selected conditions.

In addition to one or more of the features described above, or as an alternative to any of the foregoing embodiments, the system may also include that the outer loop anti-windup request limits permit the control device controlled by the inner control loop faster response in operation than predetermined limits.

In addition to one or more of the features described above, or as an alternative to any of the foregoing embodiments, the system may also include that the outer loop anti-windup request limits permits more robust anti-windup protection under degraded operating conditions of the control device controlled by the inner control loop, wherein the degraded operation include sticking or sluggish operation compared to specified operation.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
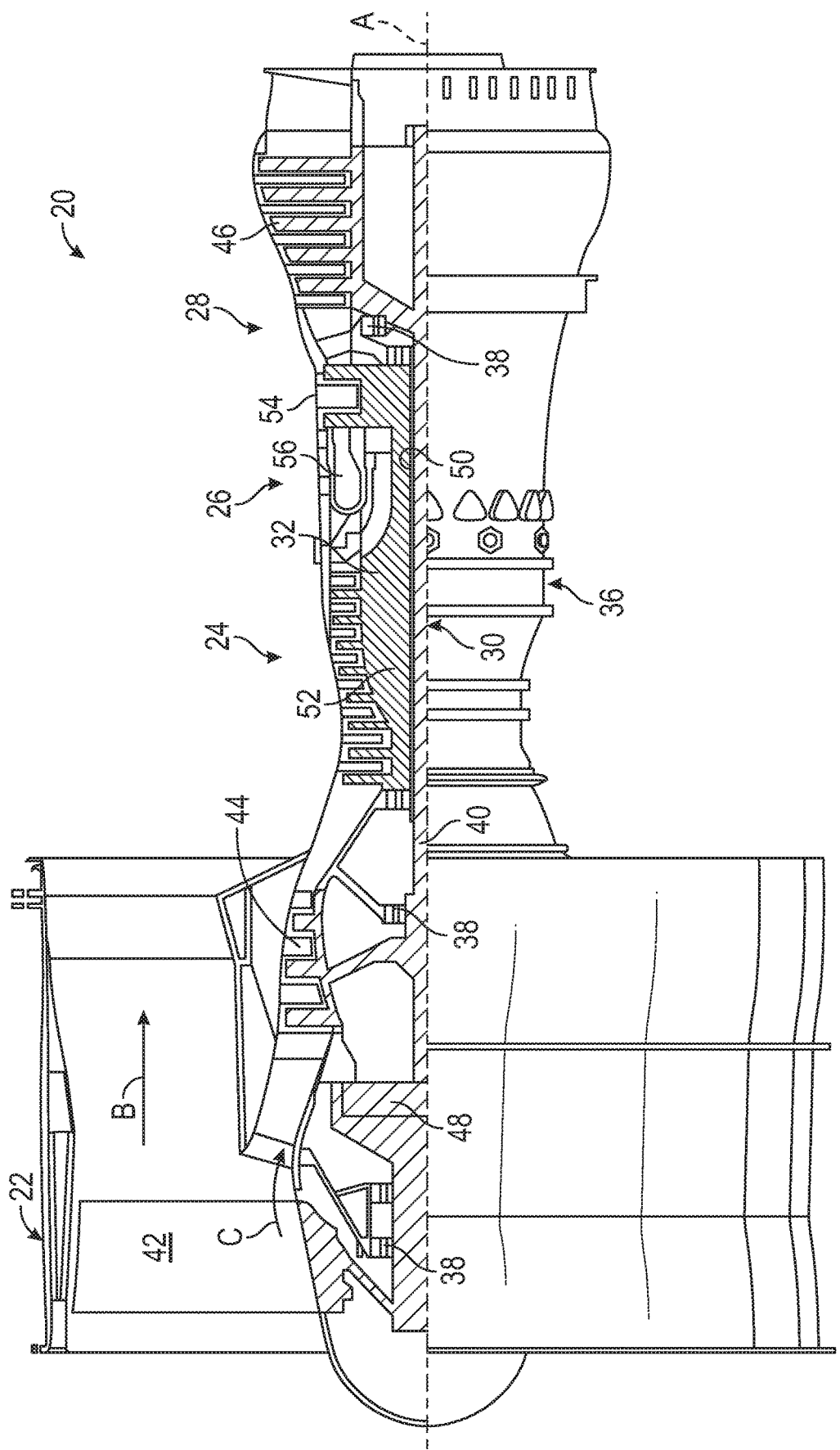
FIG. 1 is a partial cross-sectional view of a gas turbine engine.

A detailed description of one or more embodiments of the disclosed apparatus and method are presented herein by way of exemplification and not limitation with reference to the Figures.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

The terminology used herein is for the purpose of describing particular examples and is not intended to be limiting. As used herein, the singular forms "a", "an" and "the" are intended to include the plural forms as well, unless the context clearly indicates otherwise. The terms "a", "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection".

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
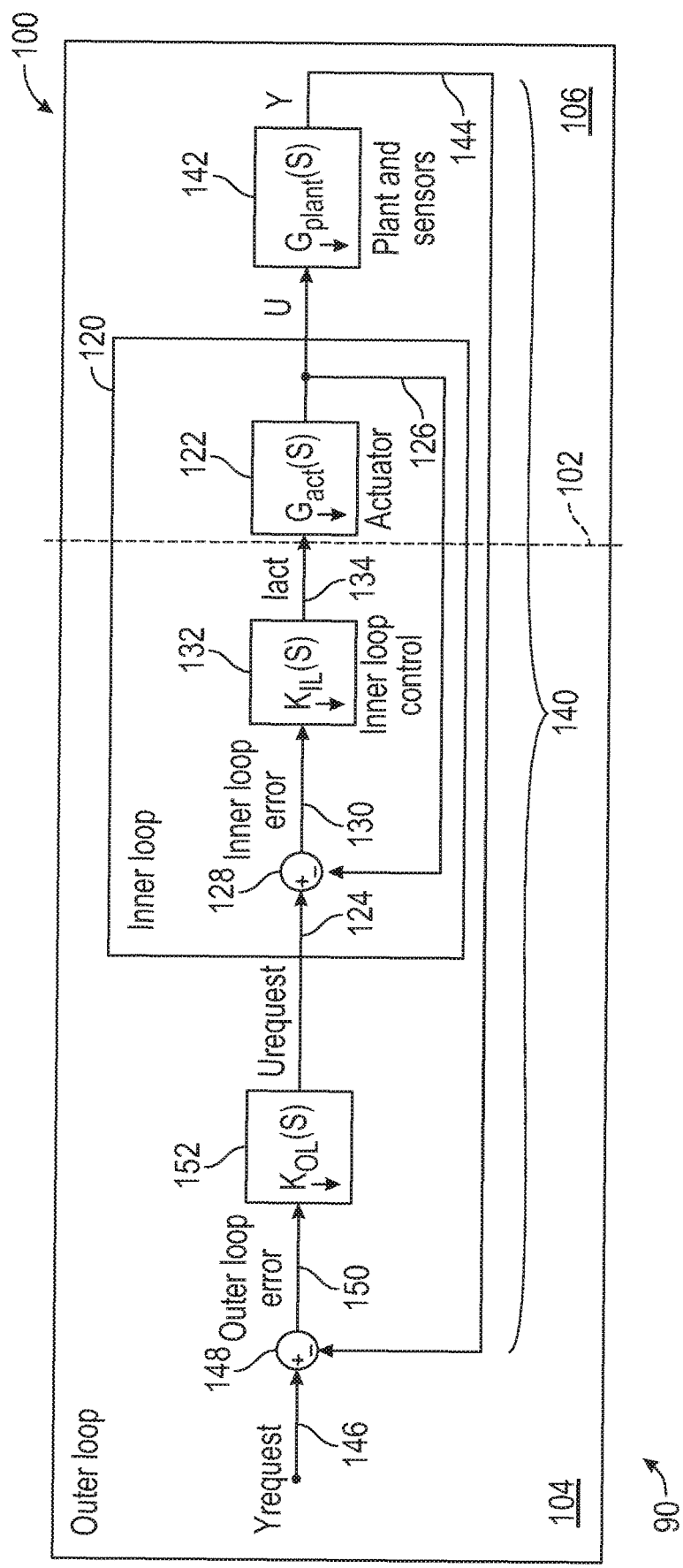
FIG. 2 is a block diagram of a cascaded control loop architecture in accordance with an exemplary embodiment.
Figure 3:
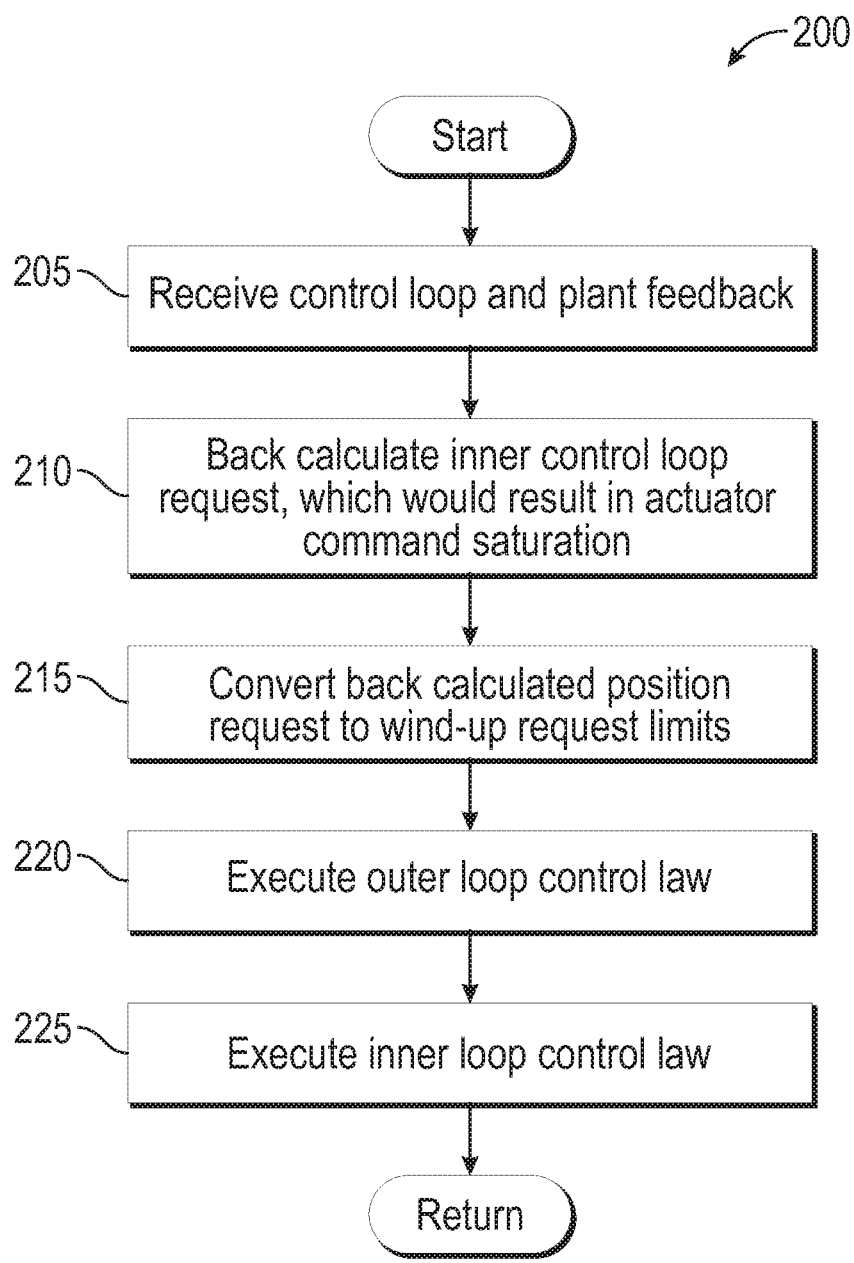
FIG. 3 is a flowchart of the method of adaptive anti-windup protection cascaded control loops in accordance with an exemplary embodiment.

FIG. 2 depicts a cascaded control loop 100 in accordance with an exemplary embodiment. The cascaded control loop 100 includes an inner control loop 120 and an outer control loop 140. The dashed line 102 provides a depiction of the separation between the control system portion 102 and the plant or hardware portion 104. Cascaded inner/outer loops (or, minor/major loops) are frequently used in control systems to improve steady state and dynamic control performance in the presence of actuator variability, disturbances, and nonlinearity. The inner control loop 120 typically controls the response of an actuator 122 based on a request 124 generated by the outer control loop 140. In one example, the inner control loop 120 is configured to control positon of the actuator 122 and the response 126 is a measured actuator position or rate of change of positon and the request 124 is a positon request. The actual actuator position or rate may be measured by sensor (not shown) to facilitate the comparison. A comparator e.g., summer 128 may be employed to compare the measured response 126 of the actuator 122 with the request 124 to formulate an error signal 130. The error signal 130 is applied to a controller 132 that is configured to formulate a command 134 to the actuator 122. In an embodiment a proportional-integral controller may be employed to ensure desirable response of the inner control loop 120, however other controller 132 configurations are possible and envisioned. For example, the controller 132 may be simply a proportional controller or even a proportional-integral-derivative controller or even a proportional-derivative controller depending on the dynamics and response characteristics of the actuator 122 and/or the inner control loop 120. Finally the actuator command 134 is applied to the actuator 122 and the response of the actuator 122 is measured as described herein. The actuator moves some form of control on a plant 142 to actually affect the desired control. The sensor is any of a variety of sensor employed in the engine including temperature, pressure, flow, speed and position sensors, and the like. In this embodiment, and for the purposes of description of the embodiments herein the sensor (not shown) is a position sensor associated with one or more of the actuators but other types of sensors (e.g., flow meters and speed sensors) also could be used.

For example, in a gas turbine engine control application, the cascaded control loop architecture 100 may be part of an engine control system as may be employed with engine 20. In such a configuration the control system may include engine 20, an actuator(s) 122 and a sensor(s) that are communicatively coupled with a processor or controller shown generally as 90 executing control laws for controlling the engine 20. In addition, the controller 90 may include a processor coupled to a memory having instructions thereon that when executed by the processor implement the methods described herein. In such a gas turbine engine example, the actuator 122 may actuate fuel valves, guide vanes, or bleed valves, and the like to physically control aspects of the operation of the gas turbine engine.

Continuing with FIG. 2 and the description of the cascaded inner and outer loop control system 100. The outer control loop 140 of the cascaded control system 100 typically controls and monitors the performance of the plant 142. Various sensors (not shown) are employed to measure and identify output parameters, 144, commonly denoted Y. For example, in the example of a gas turbine engine, the operating parameters such as pressures and temperatures of the gas turbine engine may be monitored by the control system 100 to evaluate the performance of the gas turbine engine. A comparator e.g., summer 148 may be employed to compare the measured response 144 of the plant 142 with the request 146 to formulate an error signal 150. The error signal 150 is applied to a controller 152 that is configured to formulate a command 124 to the inner control loop 120. In an embodiment a proportional-integral (PI) controller may be employed to ensure desirable response of the inner control loop 140, however other controller 152 configurations are possible and envisioned. For example, the controller 152 may be a proportional-integral-derivative (PID) controller, a multivariable PI or PID controller, or a model predictive controller including constrained integral action in some form depending on such factors as the dynamics and response characteristics of the plant 142, the inner control loop 120, and the outer control loop 140.

The outer loop controller generally will incorporate some form of integral control to provide precise regulation and drive errors to zero. In this case, the outer loop control 140 employs a scheme to prevent integral windup, which can occur due to saturation in the inner control loop 120, wherein the control signal 134 to the actuator 122 also denoted signal La encounters a limit or saturation, generally due to limits on actuation rate or range capability of the actuator 122. For example, an actuator (e.g., actuator 122) may be controlled by current. In this case, there will be maximum and minimum limits (physically, mechanically, electrically) on how much current can be driven to the actuation system, and saturation will occur when these limits are encountered. As stated earlier, these limitations are commonly conservatively established to provide acceptable performance with even the worst-case actuator 122 and therefore do not in general take full advantage of available actuation system capability. Additionally, this limiting may not be effective in preventing integral windup under failure conditions such as a sticking or sluggish actuator, which may result in poor control (large overshoot) upon recovery. One approach for outer loop integral anti-windup protection is to rate and range limit the outer control loop command/inner loop request 124 based on an assumed capability of the actuator 122.

To address these concerns an adaptive outer loop range and/or rate limiting function is provided. In an embodiment, the static, predefined anti-windup outer loop command/inner loop request limits are replaced with adaptive limits, constructed specifically to allow operation up to the actual inner loop actuator command saturation limits without exceeding them. As a result, the performance of the cascaded control architecture 100 is more accurate, robust, and tolerant of actuator 122 variances. These adaptive saturation limits also enable the system to slow down performance in the face of a sluggish actuator and allow continued (albeit, restrained) operation in the event of inner loop control degradation, all the way down to an immovable actuator (stuck).

To implement the described anti-windup processes 200. The method may be embodied in software, firmware that are computer readable program instructions that when executed on a processor are configured to cause the processor and thereby the controller to carry out aspects of the present disclosure. The method 200 initiates as process step 205 with receiving an inner loop (actuator) and outer loop (plant) feedback signals. As stated earlier, the actuator feedback may include an actual position and/or rate of the actuator 122 and the current drawn by the actuator 122, and the like. Based on the current signal, the process 200 back-calculates an inner control loop position request(s) 124, such that, it would cause actuator command saturation, as depicted at process step 210. The process 200 continues at process step 215 with converting the back-calculated inner loop request (that would otherwise result in actuator saturation) to outer loop anti-windup request limits using kinematic relationships as depicted at process block 215. In an embodiment, the inner control loop 120 typically regulates the position of an actuator 122 in stroke, typically measured in inches. The stroke position of the actuator 122 is related to an engine effector position (fuel flow, vane angle, bleed position, etc.) through a kinematic relationship via moveable hardware. Stroke limitations for the inner control loop 120 can be converted to effector limitations for the outer control loop 140 using this relationship as well. As such, the kinematic relationships are defined by the physical relationships of a control device to the plant. For example, in an embodiment the limits may be calculated as depicted in equations 1 and 2.

$$U_{MAX} = U_{FDBK} + K_{IL}^{-1} I_{sat+} \quad (1)$$

$$U_{MIN} = U_{FDBK} - K_{IL}^{-1} I_{sat-} \quad (2)$$

where $U_{MAX}$ is the maximum value for the outer loop command/inner loop request 124, $U_{MIN}$ is the minimum value for the outer loop command/inner loop request 124, $U_{FDBK}$ is the feedback position for the actuator $I_{sat}+$ is the maximum actuator current $I_{sat}-$ is the minimum actuator current $K_{IL}^{-1}$ is an inverse of the inner loop transfer function (in whatever form it takes)

It should be appreciated that in an embodiment, the outer loop anti-windup request limits as computed at process step 215 may be altered (by additional bounding) if needed to prevent long term operation at actuator command saturation limits. The method 200 continues with executing the outer loop control law as depicted at process block 220 and continues to then execute the inner loop control law as depicted at process block 225.

Advantageously, it should be appreciated that this approach allows and facilitates full utilization of the available actuator capability, while providing protection against integral windup. Furthermore, it permits full use of actuator rate capability for faster response in normal (un-degraded) operation. It avoids conservative/worst-case predefined range and rate limiting that limits system performance and as a result, yields better that worst-case capable inner-loop control (e.g., 120). It also facilitates having immediate access to full rate capability of actuator as needed by outer loop control 140 and finally, provides for more robust anti-windup protection under failure or degraded conditions, such as sticking or sluggish actuator by permitting operation and evaluation against actual actuator constraints.

The term "about" is intended to include the degree of error associated with measurement of the particular quantity based upon the equipment available at the time of filing the application. For example, "about" can include a range of ±8% or 5%, or 2% of a given value.

The terms "comprises" and/or "comprising," "includes," "including," "has," "having," "contains" or "containing," or any other variation thereof, when used in this specification, specify the presence of stated features, integers, steps, operations, elements, and/or components, but do not preclude the presence or addition of one or more other features, integers, steps, operations, elements, components, and/or groups thereof. References in the specification to "one embodiment," "an embodiment," "an example embodiment", "example" etc., indicate that the embodiment described can, but need not include a particular feature, structure, or characteristic. Moreover, such phrases are not necessarily referring to the same example. Further, when a particular feature, structure, or characteristic is described in connection with an example, it is submitted that such feature, structure, or characteristic may be employed in connection with other examples whether or not explicitly described.

The present examples may be a system, a method, and/or a computer program product at any possible technical detail level of integration. The computer program product may include a computer readable storage medium (or media) having software, firmware that are computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of programming languages, including an object oriented programming language such as Java, Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of adaptive anti-windup protection for a control system with cascaded inner control loop and an outer control loops, the method including:
    receiving an inner control loop feedback signal indicative of a response of a control device controlled by an inner control loop;
    calculating an inner control loop request such that, it would cause saturation of the control device controlled by the inner control loop;
    determining outer loop anti-windup request limits based at least in part on the inner control loop request and kinematic relationships between the control device and a plant;
    modifying the outer loop anti-windup request limits when the control device controlled by the inner control loop operates at saturation; and
    providing the outer loop anti-windup request limits to a controller of the outer control loop.

2. The method of adaptive anti-windup protection of claim 1, further including:
applying the outer loop anti-windup request limits to a controller of the outer control loop to limit the inner control loop request generated thereby;
receiving an outer loop feedback signal indicative of a response of the plant controlled by the outer control loop;
executing an outer control loop control law based on the outer loop anti-windup request limits; and
executing an inner control loop control law subject to the outer loop anti-windup request limits.

3. The method of adaptive anti-windup protection of claim 1, wherein the control device controlled by the inner control loop is an actuator.

4. The method of adaptive anti-windup protection of claim 3, wherein the inner control loop feedback signal is at least one of a position of the actuator, a rate of the actuator, and a current drawn by the actuator under selected conditions.

5. The method of adaptive anti-windup protection of claim 1, wherein calculating the inner control loop request is based on at least one of the inner control loop feedback signal, a command of the control device controlled by the inner control loop that would result in saturation of the control device, and an inverse of a transfer function of a controller of the inner control loop.

6. The method of adaptive anti-windup protection of claim 1, wherein the plant controlled by the outer control loop is a gas turbine engine.

7. The method of adaptive anti-windup protection of claim 6, wherein the outer loop feedback signal is at least one of a pressure, a temperature, a fuel flow associated with the gas turbine engine under selected conditions.

8. The method of adaptive anti-windup protection of claim 1, wherein the outer loop anti-windup request limits permit the control device controlled by the inner control loop faster response in operation than predetermined limits.

9. The method of adaptive anti-windup protection of claim 1, wherein the outer loop anti-windup request limits permits more robust anti-windup protection under degraded operating conditions of the control device controlled by the inner control loop, wherein the degraded operation include sticking or sluggish operation compared to specified operation.

10. A control system with cascaded inner control loop and an outer control loops having adaptive anti-windup protection, the control system comprising:
a control system including a controller having an cascaded inner control loop and the outer control loop;
a control device responsive to the inner control loop;
a plant responsive to the control device and the outer control loop;
wherein the controller is configured to:
receive an inner control loop feedback signal indicative of a response of a device controlled by the inner control loop;
calculate an inner control loop request such that, it would cause saturation of the device controlled by the inner control loop;
determine outer loop anti-windup request limits based at least in part on the inner control loop request and kinematic relationships between the control device and the plant;
modify the outer loop anti-windup request limits if the device controlled by the inner control loop operates at saturation; and
provide the outer loop anti-windup request limits to a controller of the outer control loop.

11. The control system of claim 10, wherein the controller is further configured to:
apply the outer loop anti-windup request limits to a controller of the outer control loop to limit the inner control loop request generated thereby;
receive an outer loop feedback signal indicative of a response of the plant controlled by the outer control loop;
execute an outer control loop control law based on the outer loop anti-windup request limits; and
execute an inner control loop control law subject to the outer loop anti-windup request limits.

12. The control system of claim 10, wherein the control device controlled by the inner control loop is an actuator.

13. The control system of claim 12, wherein the inner control loop feedback signal is at least one of a position of the actuator, a rate of the actuator, and a current drawn by the actuator under selected conditions.

14. The control system of claim 10, wherein calculating the inner control loop request is based on at least one of the inner control loop feedback signal, a command of the device controlled by the inner control loop that would result in saturation of the device, and an inverse of a transfer function of a controller of the inner control loop.

15. The control system of claim 10, wherein the plant controlled by the control device and the outer control loop is a gas turbine engine.

16. The control system of claim 15, wherein the outer loop feedback signal is at least one of a pressure, a temperature, and a fuel flow associated with the gas turbine engine under selected conditions.

17. The control system of claim 10, wherein the outer loop anti-windup request limits permit the control device controlled by the inner control loop faster response in operation than predetermined limits.

18. The control system of claim 10, wherein the outer loop anti-windup request limits permits more robust anti-windup protection under degraded operating conditions of the control device controlled by the inner control loop, wherein the degraded operation include sticking or sluggish operation compared to specified operation.

* * * * *